United States Patent
Gnad

[11] 3,923,776
[45] Dec. 2, 1975

[54] MONOAZO DYE FROM AN AMINOBENZENE CARBOXYLIC ESTER DIAZO COMPONENT AND A PYRIDONE COUPLING COMPONENT

[75] Inventor: Gerhard Gnad, Ludwigshafen, Germany

[73] Assignee: Badische Anilin- & Soda-Fabrik Aktiengesellschaft, Ludwigshafen (Rhine), Germany

[22] Filed: Sept. 20, 1972

[21] Appl. No.: 290,708

Related U.S. Application Data

[62] Division of Ser. No. 25,253, April 2, 1970, abandoned.

[30] Foreign Application Priority Data

Apr. 3, 1969  Germany............................. 1917278

[52] U.S. Cl. ................................................. 260/156
[51] Int. Cl.² ......................................... C09B 29/36
[58] Field of Search ..................................... 260/156

[56] References Cited
UNITED STATES PATENTS

| | | |
|---|---|---|
| 3,487,066 | 12/1969 | Ritter et al........................... 260/156 |
| 3,640,674 | 2/1972 | Berrie et al......................... 260/156 |

*Primary Examiner*—Norma S. Milestone
*Assistant Examiner*—Robert W. Ramsuer
*Attorney, Agent, or Firm*—Johnston, Keil, Thompson & Shurtleff

[57] ABSTRACT

Monoazo dyes having the formula:

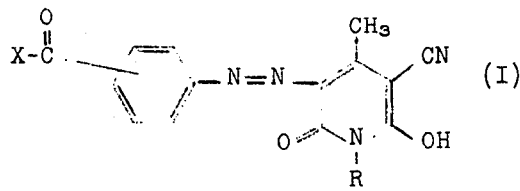

where X is $(OCH_2CH_2)_nOZ$, R is alkyl of one to four carbon atoms, alkyl of two to four carbon atoms which bears $—OH$, $—OCH_3$ or $—OC_2H_5$ as a substituent, n is 2 to 3 and Z is alkyl of one to four carbon atoms. The dyes are especially useful for dyeing synthetic polyesters.

3 Claims, No Drawings

MONOAZO DYE FROM AN AMINOBENZENE CARBOXYLIC ESTER DIAZO COMPONENT AND A PYRIDONE COUPLING COMPONENT

This application is a division of U.S. application Ser. No. 25,253 filed on Apr. 2, 1970 now abandoned.

The carbalkoxy radicals as substituents for the diazo components contain for example the following alcohol components: HO—(CH$_2$CH$_2$O)$_2$CH$_3$, HO(CH$_2$CH$_2$O)$_2$C$_2$H$_5$, HO(CH$_2$CH$_2$O)$_2$C$_4$H$_9$, HO(CH$_2$CH$_2$O)$_3$CH$_3$ or HO(CH$_2$CH$_2$O)$_2$C$_2$H$_5$.

The following aniline derivatives are given as examples of diazo components: the methyldiglycol, ethyldiglycol, butyldiglycol, methyltriglycol or ethyltriglycol esters of 2-aminobenzoic, 3-aminobenzoic and 4-aminobenzoic acids.

Examples of radicals R in the dyes having the general formula are: methyl, ethyl, propyl, n-butyl, isobutyl, β-methoxyethyl, γ-methoxypropyl, β-hydroxyethyl, β-hydroxypropyl, γ-hydroxypropyl and γ-ethoxypropyl.

Preferred radicals R are alkyl groups having one to four carbon atoms or γ-methoxypropyl.

Dyes of the formula

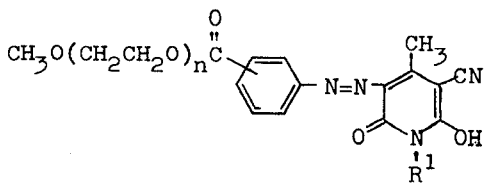

where
n is 2 or 3 and
R$^1$ is alkyl of one to four carbon atoms or γ-methoxypropyl are of particular industrial importance.
A preferred dye is for example:

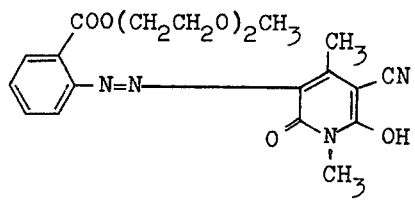

The new dyes are yellow and give greenish yellow shades having excellent fastness properties on synthetic fibrous material, particularly on polyesters. The fastness to light and dry-heat pleating and setting are particularly good.

For the production of the new dyes, diazo compounds of amines having the general formula

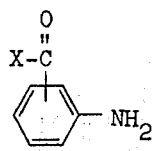

may be reacted with coupling components having the general formula:

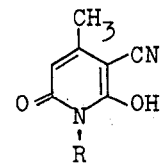

Coupling is carried out as usual in an aqueous medium with or without the addition of solvents at a weakly acid to alkaline pH.

The invention is illustrated by the following Examples. References to parts and percentages relate to weight unless otherwise stated.

EXAMPLE 1

160 Parts of ice is added to a solution of 23.9 parts of the methyldiglycol ester of 2-aminobenzoic acid in 160 parts of water and 25 parts by volume of concentrated hydrochloric acid and then 30 parts by volume of 23% sodium nitrite solution is run in at 0° to 5°C. The whole is stirred at the same temperature for another 2 hours and any excess of nitrous acid present is then removed as usual. The diazo solution is added in portions to a solution of 22.9 parts of N-γ-methoxypropyl-2-hydroxy-3-cyano-4-methylpyridon-(6), 5 parts of sodium hydroxide and 10 parts of sodium carbonate in 300 parts by volume of water with an addition of 200 parts of ice. When coupling is over, the deposited dye having the formula:

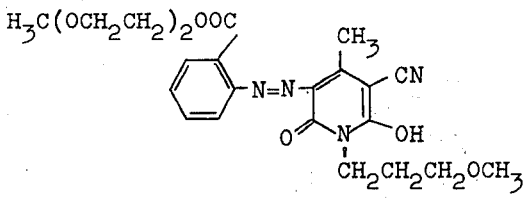

is suction filtered, washed with water and dried. It is obtained in the form of a yellow powder which dissolves in dimethylformamide with a yellow color.

100 Parts of polyethylene terephthalate cloth is dyed in a dye liquor containing 1 part of the finely divided dye thus obtained, 2 parts of the sulfonated adduct of 80 moles of ethylene oxide to 1 mole of sperm oil alcohol and 2,000 parts of water for 60 minutes at 120°C in a pressure apparatus. A pure greenish yellow dyeing is obtained which has good thermal resistance and outstanding fastness to light.

Using the diazo components and coupling components set out in the following Table, dyes having similar tinctorial properties are obtained by analogous methods.

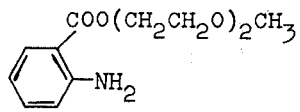 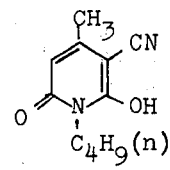

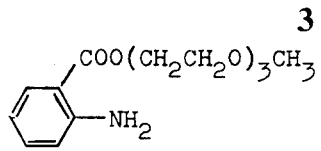
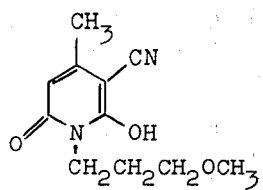
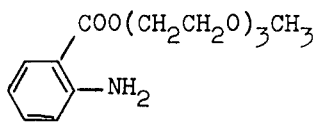
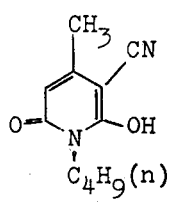
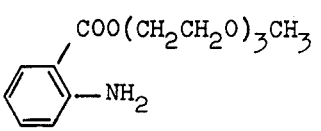
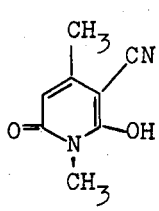
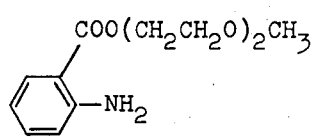
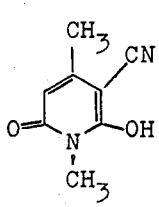
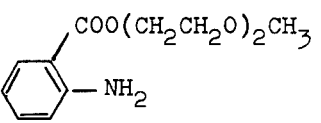
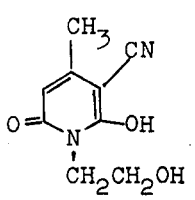
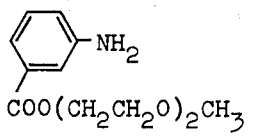
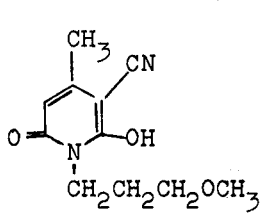
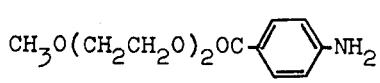
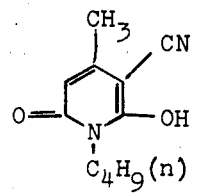
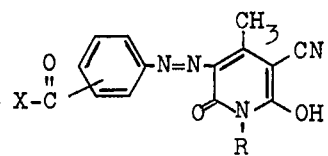
I claim:
1. An azo dye of the formula
where
X is $(OCH_2CH_2)_nOZ$,
R is alkyl of one to four carbon atoms, or alkyl of two to four carbon atoms substituted by —OH, —OCH$_3$ or —OC$_2$H$_5$,
$n$ is 2 or 3 and
Z is alkyl of one to four carbon atoms.
2. An azo dye of the formula

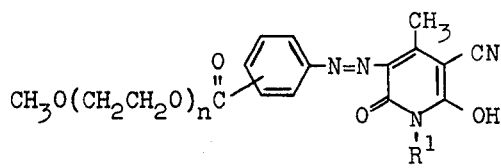
where
n is 2 or 3 and
R¹ is alkyl of one to four carbon atoms or γ-methoxypropyl.
3. The dye of the formula
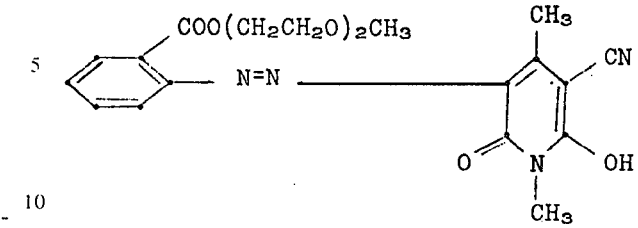
* * * * *